United States Patent
Kirsch et al.

(10) Patent No.: US 8,108,558 B2
(45) Date of Patent: Jan. 31, 2012

(54) CIRCUIT ARRANGEMENT AND METHOD FOR SYNCHRONIZATION OF CLOCKS IN A NETWORK

(75) Inventors: Fabian Kirsch, Clausthal-Zellerfeld (DE); Peter Gulden, München (DE); Martin Vossiek, Hildesheim (DE)

(73) Assignee: Symeo GmbH, Neubiberg (DE)

( * ) Notice: Subject to any disclaimer, the term of this patent is extended or adjusted under 35 U.S.C. 154(b) by 251 days.

(21) Appl. No.: 12/390,586

(22) Filed: Feb. 23, 2009

(65) Prior Publication Data

US 2009/0222589 A1 Sep. 3, 2009

(30) Foreign Application Priority Data

Feb. 22, 2008 (DE) .......................... 10 2008 010 536

(51) Int. Cl.
G06F 15/16 (2006.01)
G06F 1/12 (2006.01)
(52) U.S. Cl. ........................................ 709/248; 713/400
(58) Field of Classification Search .......... 709/201–203, 709/217–232, 248–250; 713/400
See application file for complete search history.

(56) References Cited

U.S. PATENT DOCUMENTS

| | | | |
|---|---|---|---|
| 3,864,681 A | 2/1975 | Olive | |
| 5,216,429 A | 6/1993 | Nakagawa et al. | |
| 7,103,124 B1 * | 9/2006 | Lindskog et al. | 375/354 |
| 7,200,766 B2 | 4/2007 | Furhrer et al. | |
| 7,260,652 B2 | 8/2007 | Fuehrer et al. | |
| 7,283,568 B2 * | 10/2007 | Robie et al. | 370/503 |
| 2002/0131398 A1 * | 9/2002 | Taylor | 370/350 |
| 2005/0020275 A1 * | 1/2005 | Agrawala et al. | 455/456.1 |
| 2005/0085259 A1 * | 4/2005 | Conner et al. | 455/552.1 |
| 2007/0133612 A1 * | 6/2007 | Hatanaka | 370/503 |
| 2008/0089363 A1 * | 4/2008 | Paulitsch et al. | 370/503 |
| 2009/0086577 A1 * | 4/2009 | Ledeczi et al. | 367/129 |

FOREIGN PATENT DOCUMENTS

| | | |
|---|---|---|
| DE | 1240146 | 3/1963 |
| DE | 1 214 754 | 4/1966 |
| DE | 1 254 206 | 11/1967 |
| DE | 100 53 525 A1 | 5/2002 |
| DE | 100 65 117 A1 | 7/2002 |
| WO | WO 03/047137 A2 | 6/2003 |

OTHER PUBLICATIONS

Li et al., "Global Clock Synchronization in Sensor Networks," IEEE Transactions on Computers, vol. 55, No. 2, Feb. 2006.

(Continued)

*Primary Examiner* — Yasin Barqadle
(74) *Attorney, Agent, or Firm* — Drinker Biddle & Reath LLP (57) ABSTRACT

A circuit arrangement and a method for synchronizing clocks in a network is provided, comprising a plurality of at least two nodes, wherein at least two of said nodes can communicated with each other and each have a local clock, wherein, in a receiving one of said nodes, from at least one transmitting other such node, a global time transmitted by said transmitting one of said node of said transmitting one of said nodes is received, and a global time of said receiving node is determined or estimated as a function of both the received global time of said transmitting node and of a local time of the receiving node's own local clock.

20 Claims, 3 Drawing Sheets

OTHER PUBLICATIONS

Eidson, "IEEE-1588 Standard for a Precision Clock Synchronization Protocol for Networked Measurement and Control Systems, A Tutorial," Agilent Technologies, Inc., Oct. 10, 2005.

Ganeriwal et al., "Timing-sync Protocol for Sensor Networks," Networked and Embedded Systems Lab (NESL), University of California, Los Angeles, Proceedings of the 1st International Conference on Embedded Networked Sensor Systems, ACM Press, New York, pp. 138-149, 2003.

Kirsch et al., "Distributed Kalman Filter for Precise and Robust Clock Synchronization in Wireless Networks," IEEE Radio and Wireless Symposium, San Diego, California, pp. 482-485, Jan. 18-22, 2009.

Maroti et al., "The Flooding Time Synchronization Protocol," Institute for Software Integrated Systems, Vanderbilt University, Nashville, Tennessee, ISIS-04-501, Feb. 21, 2004.

Mills, "Network Time Protocol (Version 3) Specification, Implementation and Analysis," RFC 1305 (Draft Standard), University of Delaware, Mar. 1992.

Olfati-Saber et al., "Consensus Filters for Sensor Networks and Distributed Sensor Fusion," Decision and Control, 2005 and 2005 European Control Conference, CDC-ECC '05, 44th IEEE Conference, pp. 6698-6703, Dec. 12-15, 2005.

Olfati-Saber, "Distributed Kalman Filter with Embedded Consensus Filters," Dartmouth College, Decision and Control, 2005 and 2005 European Control Conference, CDC-ECC '05, 44th IEEE Conference, pp. 8179-8184, Dec. 12-15, 2005.

Rentel et al., "Network Synchronization in Wireless Ad Hoc Networks," Carleton University, Systems and Computer Engineering, Technical Repoert SCE-04-08, Jul. 2004.

Rentel, "Network Time Synchronization and Code-based Scheduling for Wireless Ad Hoc Networks," Thesis submitted to The Faculty of Graduate Studies and Research, Department of Systems and Computer Engineering, Carleton University, Ottawa, Ontario, Canada, Jan. 17, 2006.

Roehr et al., "Method for High Precision Clock Synchronization in Wireless Systems with Application to Radio Navigation," Institute of Electrical Information Technology, Clausthal University of Technology, Germany, Radio and Wireless Symposium, pp. 551-554, Jan. 2007.

Vossiek et al., "Wireless Local Positioning," Microwave Magazine of the IEEE, vol. 4, issue 4, pp. 77-86, Dec. 2003.

Rentel, "Network Time Synchronization and Code-based Scheduling for Wireless Ad Hoc Networks", PhD Dissertation, Carleton University, Ottawa, Ontario, Canada, Jan. 17, 2006, pp. i-164.

* cited by examiner

CIRCUIT ARRANGEMENT AND METHOD FOR SYNCHRONIZATION OF CLOCKS IN A NETWORK

BACKGROUND

The invention relates to a circuit arrangement or a method for synchronizing clocks in a network comprising a plurality of at least two nodes, wherein at least two of these nodes can communicate with each other and each have a local clock.

High-precision synchronization of networks is necessary in many new systems to allocate unambiguous time points on a common time scale to various events. This must be possible even if the events occur on different stations or at different nodes. For time division multiplex operation, a common time base is necessary, in particular, to be able to properly separate various channels from each other.

In order to achieve high-precision synchronization, clock sources have been necessary which provide a very precisely known frequency. The requirements as to serial scattering and drift cause substantial cost. The clock sources must be configured in such a way that they only slightly drift from their frequency in the course of ageing and also in dependence on varying ambient conditions, such as varying temperature.

As a result, relatively large guard intervals have been used in TDMA (Time Division Multiple Access) networks to ensure proper channel separation despite suboptimal synchronicity. On the one hand this either leads to poor channel utilization or to very long time slots, and on the other hand to unnecessarily long operating periods for the receiver, since the receiver must already be operating during the guard interval.

If a network is used for coordinating actuators and sensors, there are also frequently real time requirements to be able to control or feedback-control complex systems in a time synchronous manner, or to allocate a precise time stamp to measuring values. A requirement as to the synchronization of actuator and/or sensor networks exists, in particular, in modern distributed measuring and feedback-control systems, such as in automation technology, vehicle technology, building technology or robotics.

In radio location systems, synchronizing the network nodes is also a central task. Simple signal delay measurements are only possible if precisely the same times are present in all stations involved in the measurement. In GPS (Global Positioning System) atomic clocks are used, for example, in satellites, or in other location systems complex synchronization methods are used to ensure clock synchronicity.

Both in measuring and communication systems, often coded or code-spread transmission signals and correlating receivers are used to improve signal-to-noise ratio in the receiver. Frequently used signal forms, also referred to as spread spectrum signals, are, for example, pseudo-random phase or amplitude-modulated pulse sequences or linearly or stepwise frequency-modulated signals. It is well known that it is very advantageous in such correlating systems if the transmitter and the receiver are pre-synchronized, since then the correlator is much simpler to realize, i.e., with smaller computing overhead in software or with simpler hardware correlators, and/or the time duration needed for correlation can be reduced.

Current approaches to solve the problems of synchronization have usually been based on having one station or one node generate locally a clock or a time scale, which is then provided to the other stations by means of the synchronization protocol. This local time scale is then established as a global time scale in the manner of a master-slave system.

One problem that remains in this approach is the stability and availability of the global time scale should individual stations fail. Serious limitations with respect to the quality of synchronization arise in radio networks, in particular, between mobile network nodes.

Well-known methods for synchronizing network nodes are, for example, NTP (Network Time Protocol), PTP (Precision Time Protocol), TPSN (Timing-Sync Protocol for Sensor Networks), or FTSP (Flooding Time Synchronization Protocol).

NTP (Network Time Protocol) is based on manually allocated strata resulting in a top-down tree structure in the allocation of time, as described in Mills, D.: Network Time Protocol (Version 3) Specification, Implementation and Analysis. RFC 1305 (Draft Standard), University of Delaware, Version March 1992. One specific aspect herein is that prior to leap seconds, two time scales are maintained for a period of time—one for the time period up to the leap second, and one for the time period following the leap second. In this manner, an NTP synchronized network is capable of providing even non-continuous timing processes in a synchronized manner.

PTP (Precision Time Protocol) utilizes the so-called best master clock protocol to determine the best available clock, as is described in IEEE 1588: Standard for a Precision Clock Synchronization Protocol for Networked Measurement and Control Systems. Subsequently, the time is distributed in a similar manner as with NTP.

TPSN (Timing-Sync Protocol for Sensor Networks) describes a tree structure among nodes able to communicate with each other, and here distributes the time scale of that node involved having the lowest serial number, as is well known from Ganeriwal, Saurabh; Kumar, Ram; Srivastava, Mani B., Timing-sync protocol for sensor networks, SenSys '03: Proceedings of the $1^{st}$ international conference on embedded networked sensor systems, New York, ACM Press, 2003.

FTSP (Flooding Time Synchronization Protocol) has a master in each cohesive tree, which is determined by the fact that it has the lowest serial number, as is known from Maroti M., Kusy B., Simon G., Ledeczi A.: The Flooding Time Synchronization Protocol, ISIS-04-501, 12 Feb. 2004.

The previously mentioned protocols have in common that failure or unavailability of a master must be detected and a new master must be determined as quickly as possible whose time scale must be adapted. This process is highly time-critical since with a desired synchronicity of 10 µs, for example, and a quartz clock difference of 40 ppm between various nodes, synchronicity is lost as early as after 0.25 s, when a master becomes unavailable, and a portion of the slaves already follows the new master, while other slaves continue to extrapolate the time scale of the old master.

To achieve high-precision synchronicity of such a structure, the intervals between individual reference measurements must be held very short. This leads to high channel loading due to synchronization alone, and to substantial basic power expenditure in mobile nodes.

While FTSP alleviates this problem by causing one node that switches from slave to master to initially extrapolate and therefore to imitate the time scale of the previous master, so that the stations of a network only slowly drift apart if the master is lost, the time of a plurality of measuring intervals is still needed, however, before the loss of a master is detected and the new master is determined.

The use of a distributed Kalman filter in networks is well known from Olfati-Saber: Distributed Kalman Filter with Embedded Consensus Filters, in: CDC-ECC '05: 12-15 Dec. 2005, pp. 8179-8184.

If a well-known distributed Kalman filter were used for time estimation, for example, foreign sensor information would pass through the consensus filter and thereby be subject to delay. If the system equation of the distributed Kalman filter is represented as $$x'=Ax+Bu$$

$$P'=APA^T+Q'$$

it is necessary that $\|A-E\|^2 \ll \epsilon$ applies to keep this systematic error, caused by the delay, small. This can be achieved by accelerating clocking to such an extent that the so-called propagation delay is short with respect to system dynamics. Herein, x is the old estimated system state, represented as a vector in the state space, and P is the covariance as a scattering parameter of the old system estimation. A is the system matrix of a typical Kalman filter. The vector u represents the intervention in the system, and the intervention effect matrix B describes the influence on the system state. Moreover, x' and P' are the new system state and the covariance of the new system estimation. Q is the covariance of the expected interferences. $\epsilon$ is a small constant depending on the requirements on filtering.

These distributed Kalman filters are not suitable, however, for use in synchronization processes, since Kalman filters can only use the sensor values of other stations in a manner affected by latency.

Other aspects of synchronization are well known from Roehr, Sven; Gulden, Peter; Vossiek, Martin: Method for High Precision Clock Synchronization in Wireless Systems with Application to Radio Navigation, pp. 551-554, Radio and Wireless Symposium, January 2007 IEEE.

Indications on the basic structure of TOA and TDOA systems may be found, for example, in M. Vossiek, L. Wiebking, P. Gulden, J. Weighardt, C. Hoffmann and P. Heide, "Wireless local positioning," IEEE Microwave Magazine, vol. 4, pp. 77-86, 2003, or in DE1254206 or in DE 1240146, DE 1214754, U.S. Pat. No. 3,864,681 or U.S. Pat. No. 5,216,429, and in literature on the Global Positioning System GPS.

SUMMARY

The object of various embodiments of the invention is to improve a circuit arrangement or a method for synchronizing clocks in a network comprising a plurality of at least two nodes in such a way that they enable synchronization with little structural or processing overhead and without a necessarily prescribed reference time source, preferably in a high-precision manner.

This object is achieved by a method for synchronizing clocks in a network, in particular a communication or data network, comprising a plurality of at least two nodes, wherein at least two of said nodes can communicate with each other and each have a local clock, wherein in a receiving one of said nodes, from at least one transmitting other one of said nodes, a global time of the transmitting one of said nodes transmitted by said transmitting one of said nodes is received, and depending on both the received global time of the transmitting node and a local time of the receiving node's own local clock, a global time of said receiving node is determined or estimated.

In particular, it is a method in a radio-based network comprising high-precision clocks for synchronizing clock and time measuring elements. Instead of a local time of each of the nodes, its global time can be used for time-based processing of further processes. Use is made of the fact that the global times of the various nodes match more exactly than their local times. Such a preferred node is therefore a network component comprising two clocks or two times. The local clock, in particular, is directly dependent on a local oscillator and reflects a local time of this node. The global time of the node on the other hand, is adjusted while taking the node's own local time into account, to match the corresponding global times of other such nodes.

The global time of the receiving node can be determined or estimated, which can be understood to be the use of calculating methods with a calculation which is as precise as possible, or an estimation method for estimating approximate time values.

It is preferred if the determined or estimated global time of the receiving node is transmitted from the receiving node to the other such nodes. This is advantageous since the global times of the largest possible number of such nodes are synchronizable in a simpler and in particular more precise manner than would be their local times. In bidirectional communication, mutual updating and improvement of all global times results. The more nodes that communicate with each other in such a manner, the better the mutual approximation of the individual global times of the nodes to a fictitious common global time.

Transmitting or receiving of times or corresponding signals or data is preferably understood to be transmitting or receiving via radio interfaces. It can also occur, however, by transmitting via lines of cable-based networks, in particular communication networks. Communication networks are to be construed not only in terms of a communication between people, but in the broadest sense as an exchange of data and signals. The communication network is preferably a real-time communication network. Nodes of a communication network are, for example, components, such as data devices or transponders, communicating via line-based or radio-based interfaces. Mobile devices of a mobile radio system or an ad-hoc network, however, can also be referred to as nodes in the broadest sense if their time determination occurs in correspondence with the processing or the structural build-up of the apparatus.

It is advantageous if the node's previous own global time is also used for determining or estimating the global time in the node. Using the previous time, or the time valid up to the determination of the new global time of the node, increases the precision of the determination or estimation of the new global time. Herein, the previous global time can be incorporated into the determination of the new global time in a weighted manner.

A confidence value for determining or estimating the global time can be determined in the node at its momentary global time. When such methodology is used with the utilization of a trustworthiness or confidence criterion, a structure comprising a higher-level central station for providing a central global time to be passed on to all individual nodes can be omitted. A top-down structure comprising a central master clock and many dependent decentralized slave clocks is therefore not necessary. Herein, preferably, the confidence value of the previous global time of the node can be used in the node for determining or estimating the global time of the node.

In the node, after receiving the global time of another node together with such a confidence value associated with this received global time, the received global time and its associated confidence value can be used advantageously by the receiving node for determining or estimating the global time of the receiving node. This is how the other such receiving nodes can determine, in particular, in the determination of their own global times, to what extent the received global time of the other, transmitting node is taken into account. The global times can be optionally weighted in a corresponding manner for determining the node's own new global time.

Preferably a deviation amount between the node's own global time and its own local time and/or between its own global time and a global time received from outside of the node is determined or estimated in the node.

For this purpose, the node's own deviation amount and/or another such node's deviation amount of such received global time can be used by the node for determining or estimating the global time. Advantageously, by taking the deviation amounts into account, in particular common drifting of the global times of all nodes with respect to the entirety of their local clocks is prevented.

In particular, in at least two of the nodes one transformation of predetermined characteristic values of the node's own local time can be determined or estimated to characteristic values of a global clock in such a way that in each of the nodes at least one such deviation amount is determined as a behavior of a ratio between each node's own local clock and each node's own global clock, and the deviation amount of one of the nodes can be used in at least one other such node as an input value for the local state estimation in at least this one other node. The deviation amount is therefore a result of the state estimation, which is transmitted to the other nodes as a transmitting signal. A simple, but sufficiently efficient deviation amount is information on whether the global clock of the transmitting node runs faster or slower, than its local clock would run if no interventions had been carried out in it.

Optionally, the result can also comprise the global time of the transmitting node and an offset as the deviation amount, in particular an offset of this global time from the node's own local time and/or the trustworthiness of this global time predicted for the transmitting point.

Herein, preferably, a correction toward a slower setpoint speed of the global time can be carried out, if a predictable proportion of the available deviation amounts surmounts a high-speed threshold and/or a correction toward a faster setpoint speed of the global time can be carried out if a predictable proportion of the available deviation amounts falls below a low-speed threshold.

Within the node, preferably, the local time of this node is adapted using a time difference to the global time of this node, and the quantities or parameters for the estimation or determination of the global time of this node referring to the previous local time are adapted, so as not to influence subsequent estimation or determination of the global time of this node by the adapted local time. If the time difference value is subtracted from the local time, the time difference value or a quantity corresponding to it is also subtracted from or added to the quantity or the parameter of the algorithm or the process for determining the global time. Otherwise, the next global time of this node would substantially deviate from the previous one and would have to be readjusted. Herein, the global time to be readjusted, when transmitted to other nodes, would also lead to substantial short-term correction readjustments in those nodes, until all global times were as closely adjusted as possible to an ideal fictitious global time.

Within the node, for determining or estimating the global time of the node, preferably, an external time of a reference time source is additionally used as an additional external global time, wherein the reference time source is associated with a time system independent from the network of the nodes. The external time of the reference time source therefore provides an external time independent from the local and global times of the nodes. The reference time source can be, for example, the DCF time system or the GPS time system, which sends DCF and GPS signals, respectively, which in turn provide time information as the external time. This is how the time system of the nodes can continuously be adjusted to a reference time system independent from the former, if a node, if able to receive such external time, passes within the transmitting range of such a reference time source. It is therefore preferred if individual units or nodes dispose of high-precision time standards, such as GPS time, and that they are included in the determination of global time in a more strongly weighted manner.

A method is preferred wherein the confidence value is allocated to the external time depending on which type of time source the reference time source (XC) originates. In this manner an external time established according to a high-precision standard and transmitted, or received by the node, can be allocated a high-value confidence, while a less trustworthy external time is allocated a lower confidence. This enables automatic optimal weighting in the new estimation of the global time in receiving nodes.

The determined or estimated global time of the node is transmitted to other such nodes at a future point in time, wherein, preferably, prior to transmitting, for the future point in time, the global time point then valid, or the global time point then valid together with a deviation amount and/or with a confidence value, is determined. This makes it possible to compensate computing times or other influences during a transmission process or during the preparation of a transmission process which could lead to the time information of the transmitted global time not corresponding to that at which the actual transmission is carried out.

Independently of this, this object is achieved by a circuit arrangement for synchronizing clocks in a network, particularly a communication or data network, comprising a plurality of at least two nodes, wherein at least two of said nodes can communicate with each other and each have a local clock, wherein at least one receiving one of these nodes has a receiving module for receiving a transmitted global time of a transmitting one of such nodes, and comprises a control, which is configured and/or controllable for determining or estimating a global time of said receiving node as a function of both the received global time of the transmitting node and a local time of the receiving node's own local clock.

Such a control can be configured in hardware and/or as a processor controlled by software. In the latter case it has a memory associated with it, in which at least one algorithm or software program is stored for controlling the processor, so that the corresponding functions and process steps can be executed.

The circuit arrangement is preferably configured with a transmitting module for transmitting the determined or estimated global time of the receiving node from the receiving node to the other such nodes.

The circuit arrangement preferably has a state estimator, configured and/or controllable for determining a confidence value within the node for its momentary global time.

In at least two of said nodes, one local state estimator is implemented per node, which is configured and/or controllable for determining a deviation amount as a behavior of a ratio between each node's own local clock and each nodes' global clock, wherein each control is configured and/or controllable for using the deviation amount of one of the nodes in at least one other such node as an input value for the local state estimation in at least this one other node.

Preferably the circuit arrangement comprises a voting module, which is configured or drivable for determining or estimating a deviation amount between the node's own global time and the node's own local time. This facilitates a vote or voting. In addition or alternatively, the voting module is configured or drivable to determine deviation amounts between the node's own global time and a global time received from outside the node. In particular, these latter deviation amounts are advantageously useable as input values for filtering, particularly Kalman filtering.

The control of such a circuit arrangement is preferably configured and/or controllable for carrying out one of the preferred methods.

In particular, each deviation amount is used within a node for influencing each local clock and for deriving a quantity from a plurality of deviation amounts from various nodes, for influencing the global clock.

Influencing the local clock preferably serves to minimize its time deviation with respect to the global clock, and influencing the global clock serves to minimize the mean speed deviation of the global clock with respect to the clocks of a plurality of nodes. The nodes have corresponding means or components to carry out measurements. In particular, the measurements, or received data have time stamps associated with them with respect to the time base of the local or the global clock of the node.

The communication network, or its nodes, can optionally also comprise a locating functionality. Preferred is a combination with a system, which facilitates locating via local radar, as is known as such from International Patent Publication No. WO 2003047137.

Thus, in particular, a novel synchronization method with distributed state estimators is provided, which cooperate amongst each other, with which high-synchronization of locally distributed system units can be achieved. Further, a state estimator, also referred to as a cooperative Kalman filter, is presented in the following. Herein, the Kalman filters mutually provide their own current state estimations. This state estimator may be utilized in an advantageous way beyond the aspects described in the present document, whenever the system dynamics of an observed system are too large to effectively use the well known distributed Kalman filters. Without the present approach, the well-known distributed Kalman filters would otherwise not be useable due to problems caused by communication delays.

DESCRIPTION OF THE DRAWINGS

An embodiment will be explained in more detail in the following with reference to the accompanying drawings, wherein.

DETAILED DESCRIPTION OF THE PREFERRED EMBODIMENTS

Figure 1:
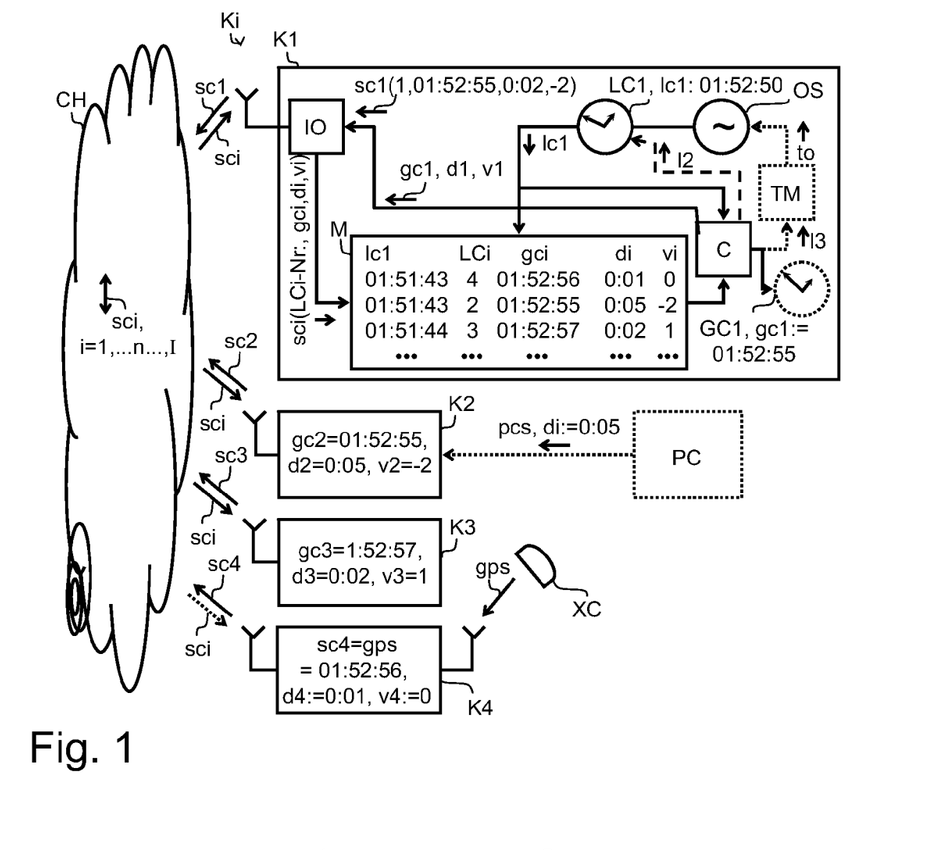
FIG. 1 is a block diagram showing nodes of a communication network, which exchange time information amongst each other and thereby synchronize their own clocks relative to the clocks of the other nodes.

As can be seen from FIG. 1, a plurality of nodes K1, K2, K3, K4, or Ki communicate via one or more channels CH of a network, wherein i stands for the corresponding node number i=1, 2, ..., n, ..., l. Transmitting signals sc1, sc2, sc3, sc4 or sci are transmitted via channel CH. It can be seen therefore that each of the nodes K1, ..., K4 preferably sends its own transmitting signal sc1, ..., sc4 and each node K1, ..., K4 receives corresponding transmitting signals sci from preferably all of the other nodes Ki. The network can be configured as a communication and/or a data network.

Moreover, nodes K1, ..., K4 can also exchange further useful or information data. In the figure and the description, however, only data, transmitting signals and other information will be described in the present case, which serve for synchronizing clocks of individual nodes Ki. The transmitting data necessary for synchronization can also be transmitted in data frames of other transmission systems as useful data or header data.

Schematically, various components and signals are illustrated in an exemplary manner for first node K1, which are necessary for carrying out a preferred method for synchronizing clocks in nodes Ki of a communication network. Apart from the signals, individual components of preferred circuit arrangements for carrying out such a method are also illustrated.

Corresponding transmitting signals sci of other nodes K2-K4 are received, and transmitting signals sc1 of this first node K1 are transmitted via an interface, in particular an antenna, from a transmitting/receiving module IO. The received transmitting signals sci preferably comprise a global time gci as time information of each node Ki sending the transmitting data or the transmitting signal sci.

The global time gci is time information determined or estimated in each node Ki. Herein, each global time gci, looked at more closely, is a fictitious global time gci, which each node Ki expects to be the physical real actual momentary time, which can deviate, however, both from the global time gci and from a local time lci of each relevant node Ki.

In addition to the global time gci, a confidence value di is preferably contained in transmitting signal sci, which indicates which trustworthiness node Ki, when establishing and sending global gci, expects itself of the accuracy of global time gci as a purely physical real global time.

Further information contained in transmitting signal sci is preferably data indicating a deviation amount vi. Sending node Ki signals with deviation amount vi to the remaining receiving nodes Ki, Kn whether it expects its own global time gci to tend to be too fast or too slow with respect to its own local time lci, or whether a correction to a faster or lower speed of the local global time was necessary at this sending node Ki. In the most simple case, the deviation amount therefore consists of two values for the states too fast or too slow.

Optionally, transmitting signal sci can also include information on the number or any other preferably unambiguous identification of transmitting node Ki or its global or local clock LCi-No., so that there is always knowledge within the receiving node whether a received information in a received transmitting signal must overwrite older information or whether it originates from another node of which no data are present as yet.

The data of the received transmitting signal sci are latched in first node K1 in a memory M. Herein, the latched data, i.e., in particular, global times gci, confidence values di and optionally deviation amounts vi each have local receiving times lc1 within node K1 or in its transmitting/receiving module IO associated with them. In other words, in particular, each received global time gci has local receiving time lc1 associated with it, which corresponds to each momentary receiving time point according to a local clock LC1. As an example it is shown for a first local receiving time 01:51:43 that a global time gc4 with a value 01:52:56 was received from fourth node K4. At the same receiving time point, a global time gc2 having a value of 01:52:55 was also received from second node K2. At a subsequent receiving time point having the local receiving time lc1 with the value of 01:51:44 a global time gc3 having a value of 01:52:57 is received from third node K3.

Additionally an estimation of the propagating time from the transmitter to the receiver can be associated with the received transmitting signal and/or stored in such a manner that the sending time point can be concluded from the receiving time point. Such arrangements can be utilized, in particular with nodes having the possibility of position estimation, to improve synchronization accuracy.

Moreover, each global time gc2-gc4 has a confidence value d2-d4 and a deviation amount v2-v4 associated with it. For example, fourth node K4 signals with its confidence value d4 having the value of 0:01 that it trusts the transmitted global time gc4 with high confidence. This is due to the fact, for example, that fourth node K4 additionally disposes of a module with which it can receive time information of a reference time source XC, in the present case, time information from a received time signal of the GPS system. Moreover, fourth node K4 transmits the information that its deviation amount v4 is set so that it corresponds to the value 0.

Second node K2 transmits a confidence value d2 having the value 0:05 as additional information, which signals low trustworthiness. Moreover, a deviation amount v2 having a value of −2 is transmitted by second node K2 to signal slow timing behavior. In the case of second node K2, this is a node which receives time information pcs from a local computer PC, wherein this time information pcs has a corresponding confidence value associated with it, which has lower trustworthiness than would be valid in the case of an external time value from a reference time source XC.

Third node K3 is an independent node without access to external time sources and, as first node K1, only carries out synchronization of its clocks on the basis of received transmitting signals sci. Consequently, the transmitted global time gc3 has the confidence value d3 having a value of 0:02, for example, and deviation amount v3 having a value of 1, for example, associated with it. Hereby low trustworthiness and fast running of its clocks are also signaled.

From this information, a control C of the first node forms the presumed or estimated global time gc1 of the first node. From this global time gc1, first node K1 will assume on the basis of the stored data and in addition its own local time lc1 that it is that assumed global time which would most closely correspond to a real global time.

To enable the communicating further nodes k2-K4 also to achieve synchronization of their clocks, control C provides corresponding information for forming the node's own transmitting signal sc1. Apart from the nodes momentary global time gc1, this is, in particular, confidence value d1 and deviation amount v1, determined or calculated by control C for this node's K1 own global time gc1. First node K1 has determined a new current global time gc1 having a value of 01:52:55 as the probably most authentic global real time.

In view of the deviation of the time previous to the currently valid global time gc1 within first node K1, its confidence value d1 valid for this new global time gc1 is set to 0:02, for example, to signal a relatively high reliability based on the calculation results. Deviation amount v1=−2 is used by first node K1 to signal that its own local time gc1 is noticeably too slow compared to the now valid, newly estimated global time gc1, so that this can also be taken into account in estimations in the remaining nodes.

The relevant data to be transmitted are then sent from transmitting/receiving module IO to the further nodes K2-K4 at a later point in time. Prior to transmission, however, control C takes care that the information transmitted is correctly associated not with the momentary point in time of information provision, but with the future transmitting time point.

Optionally, control C can also bring about that the local clock LC1 or an oscillator OS, which outputs a clock signal for local clock LC1 and further components of first node K1, is provided for correcting local clock LC1 or the further components. A local correction signal 12 is therefore output in a corresponding manner by control C to local clock LC1 to adjust local time lc1 to the now valid global time gc1 of first node K1. A further local correction signal 13 is correspondingly optionally applied to a trim module TM, which drives oscillator OS faster or slower via a trim signal.

Figure 2:
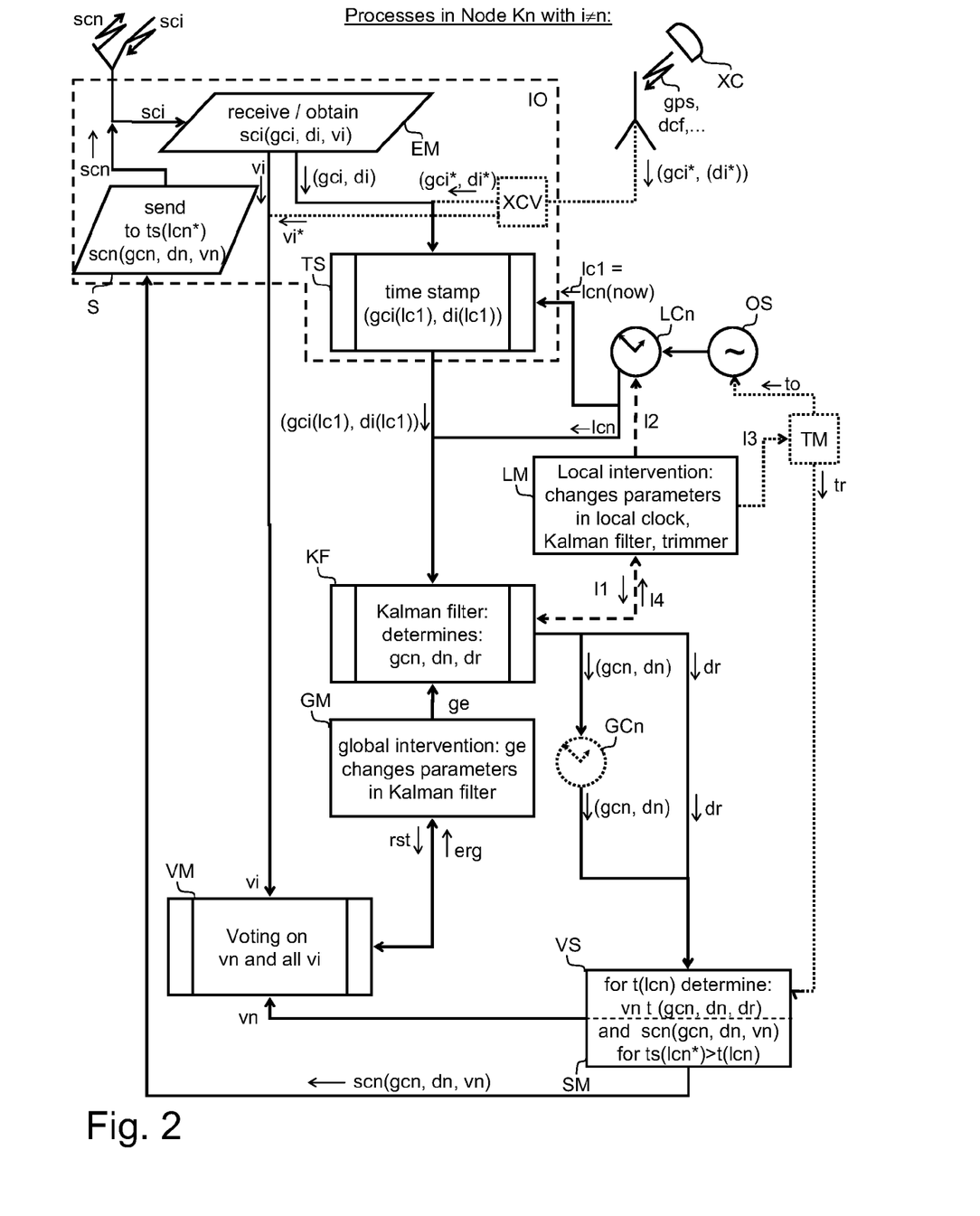
FIG. 2 is a flowchart showing components and method steps for illustrating the method sequence in such a node.

FIG. 2 shows an exemplary node Kn having more detail as against FIG. 1 with respect to components, processing steps and data or signals. As far as the same reference numerals are used as in FIG. 1 or further figures, these are equally structured or equivalently effective components or processes or signals and data.

Node Kn, again, has a transmitting/receiving module IO as a first component. It preferably comprises a receiving module EM, which is formed for receiving or obtaining the transmitting signals sci of further nodes. In particular, receiving module EM carries out a first preprocessing of received transmitting signals sci. This is how, of the received transmitting signals sci, the global times gci and the confidence values di associated with them are fed to a time stamp TS, in which at least these data portions, i.e., the received global time gci and the associated confidence value di have the local receiving time lc1 associated with them, which corresponds to the momentary local time lcn of node Kn. Advantageously, the association by way of time stamp TS is carried out already in the area of transmitting/receiving module IO, since this means that no processing time is lost and the identification of the received data can be carried out which is as close as possible to the local receiving time lc1. Optionally, a propagation time can be estimated and taken into account in any calculations.

Optionally, the time stamp TS can also be applied to each received deviation amount vi with the local receiving time lc1. In the embodiment shown it is preferred, however, to apply the received deviation amounts vi directly to a voting module VM.

The global times gci (lc1) provided with the local receiving times lc1 and the confidence values di (lc1) associated with them, are fed to a state estimator KF. State estimator KF determines a global time gcn for this node Kn via the data contained in the former. Moreover, the Kalman filter or another determination or estimation process in the state estimator KF additionally determines a confidence value dn for this determined global time gcn in addition to the determined global time gcn of node Kn. These are output by the state estimator and provided for further processing in node Kn.

Preferably, state estimator KF determines at the same time a time drift dr between a local clock LCn and global clock GCn, or between local time lcn and global time gcn of this node Kn in this process. Drift dr indicates the speed with which global clock GCn and local clock LCn of node Kn drift apart.

The thus determined parameters, i.e., in particular, global time gcn, its confidence value dn and drift dr, are applied to a trustworthiness estimator VS by state estimator KF. Trustworthiness estimator VS determines for a certain time point ts (lcn*) of local time lc the then valid deviation amount vn for the then valid global time gcn of this node Kn as well as its confidence. This deviation amount vn is then preferably also applicable as a deviation amount vn to voting module VM in addition to received deviation amounts vi.

The parameters of state estimator KF, in particular global time gcn, confidence value dn and deviation amount vn are also fed to a transmitting parameter module, which is configured to provide a transmitting signal scn for sending from this node Kn. Providing of transmitting signal scn is carried out in such a way that, for a future planned transmitting time ts (lcn*), at a future local time lcn, the global time gcn then valid from the point of view of this node Kn, is provided with the then associated parameters, i.e., confidence value dn and deviation amount vn.

This transmitting signal scn thus determined and provided for a future time point is then provided to a transmitting module S of transmitting/receiving module IO, to be sent by transmitting module S at the correct, predetermined future transmitting time point ts (lcn*).

A further advantageous component is a global intervention module GM, which generates a global intervention parameter ge for state estimator KF and applies it to the latter. Global intervention parameter ge is for changing the parameters in the state estimator formed as a Kalman filter, if a vote in voting module VM results in a voting result erg making a global intervention necessary. Moreover, global intervention module GM provides a reset signal rst for voting module VM. Reset signal rst causes the deviation amounts in memory to be discarded, which have led to the global intervention. In this way it is prevented that such a deviation amount is included in a plurality of votes.

Moreover, a local intervention can optionally be carried out by means of a local intervention module LM to change parameters in local clock LCn. Furthermore, the local intervention parameter in state estimator KF or in its Kalman filter, as well as optionally a trimmer TM can be used for adjusting their parameters. For this purpose, local intervention module LM receives a local intervention drive signal from state estimator KF. Moreover, corresponding local correction signals l2, l3 are applied by local intervention module LM to local clock LCn or to trim module TM. A state estimator correction signal l1 is applied to state estimator KF by local intervention module LM not only to adjust local time lcn in the case of local intervention but also to change quantities relating to this local time within the state estimator, in particular local receiving time lc1, which is linked to the received transmitting signal parameters, in correspondence to the change in local time lcn, in such a manner that the global clock to continues to run in a manner as far as possible unaffected by this.

For the case that an optional trim module TM is provided, it can be configured to provide a trim signal for trustworthiness estimator VS and a trim signal to for oscillator OS and/or local clock LCn on the basis of control signal l3 applied by local intervention module LM. Local oscillator OS, in turn, serves to apply a suitable clock signal to local clock LCn. Optionally, oscillator OS can also supply further components of the circuit arrangement with this or other clock signals.

Node Kn shown additionally includes an optional further interface of the transmitting/receiving module for receiving signals from a reference time source XC, in particular, a GPS signal from the global positioning system (GPS) or a standardized time signal according to the time signal dcf of the DCF standard, for example. Such received signals are provided as an external global time gci* by transmitting/receiving module IO as further global times. Since these external global times gci* have neither a confidence value di* nor a deviation amount, since such parameters are not provided by their time sources, transmitting/receiving module IO preferably additionally has a trustworthiness allocation module XCV for allocating a suitable confidence value di* and/or an associated deviation amount vi*. This enables the received external global times gci* to be treated by the further components and process steps of node Kn just the same as the transmitting signals sci or their data received from other nodes.

The various modules can also be a combined arrangement having, as the case may be, only one single processor and corresponding terminals, which carries out corresponding data processing by means of a pure software algorithm. Basically the individual modules can also be formed by hardware components or combined hard and software components, however. Corresponding programs can be stored in memory M or a further memory means in order to drive the various processes in a suitable manner.

Figure 3:
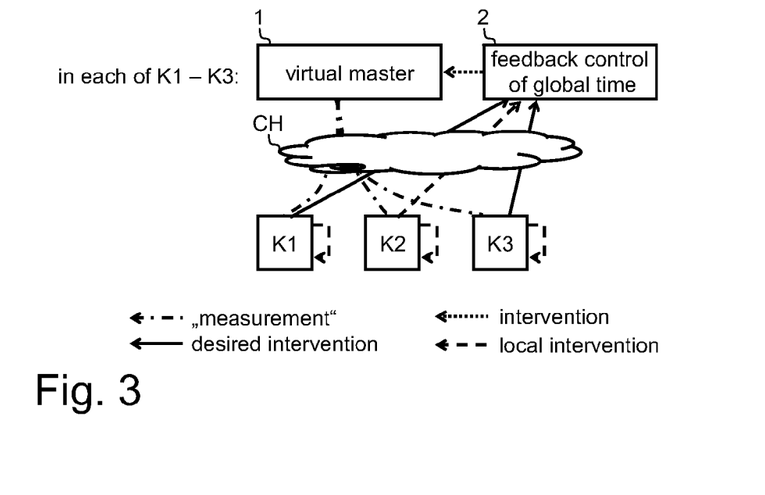
FIG. 3 is a block diagram showing three nodes in a communication network for illustrating a basic method idea.

To explain the basic idea of the preferred method and circuit arrangement, FIG. 3 shows three nodes K1, K2, K3, which communicate via one or more channels CH. Each of nodes K1-K3 carries out corresponding feedback control of global times in a feedback-control 2. In the ideal case, theoretically all three nodes K1-K3 arrive at the same global time. In reality, the global times will always vary, at least slightly, however, since the individual components in the various nodes K1-K3 are not identical and therefore will always have variations with respect to the timing of the internal clocks. The thus determined global times of the various nodes K1-K3 are distributed to the remaining nodes K1-K3 as by a virtual master 1, which is regarded as a measurement or the reception of a reference time within the individual nodes K1-K3. In other words, the system is comparable to a tree structure, in which a virtual master 1 provides a time prescription for the various subordinated nodes K1-K3. This virtual master is formed by weighted cooperation of nodes K1-K3 themselves. The difference with respect to an actual master is that not one single reference time is provided for the individual nodes K1-K3, but that the individual nodes K1-K3 have a plurality of various global times sent to them, whereupon the individual nodes K1-K3 will try by way of their state estimators to determine their own global time from the received global times. This is then used by each of nodes K1-K3 to drive themselves and moreover to enable synchronization of these further nodes K1-K3 by transmission to these further nodes K1-K3.

Figure 4:
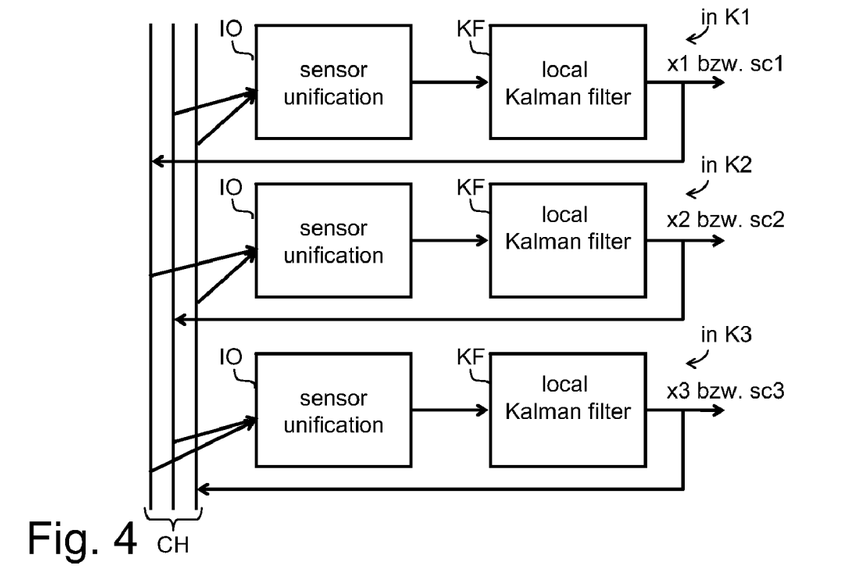
FIG. 4 is a block diagram showing a basic principle of the cooperative Kalman filters as state estimators.

FIG. 4 shows a further arrangement for illustrating the basic idea. The individual nodes K1-K3 communicate via one or a plurality of channels CH. Herein, a sensor unification takes place by their transmitting/receiving module IO, at which the global times or transmitting signals sc1-sc3 are received from each of the other sensors or nodes. The received data marked with a time stamp is then fed to a state estimator KF which is preferably formed as a local Kalman filter and carries out a new determination of a global time. The corresponding global time, the system state x1-x3 or a corresponding transmitting signal sc1-sc3 are then provided to further processes within node K1-K3, or transmitted again via the channel or channels CH.

In other words, a basic aspect of the method or the circuit arrangement for time synchronization of clocks in nodes consists in implementing state estimators in a plurality of such nodes. The term state estimator KF in the context of the present description is a mathematical model or its technical implementation in hard and/or software, which approximates the state of the model in the best possible way to the state of the system modeled in reality while taking measuring data or received data of other nodes Ki into account. These state estimators KF can be based on, amongst others, a Kalman filter, a particle filter, an adaptive filter, Monte-Carlo methods and/or models based on Bayes statistics.

State estimators KF are configured in such a way that they estimate a global time gcn, gci with the associated confidence dn, di using the relevant local clock source or local time lcn, lci. The term clock LCi, LCn, GCi, GCn in the present context is a clock and/or time measurement element. Characteristics of such a clock are its running speed, i.e., its clock rate, and the absolute time, i.e., a counter value or a number related to an agreed reference point in time within each node Kn, Ki. Nodes Ki, Kn are to be configured in such a way that they can inform another state estimator KF on at least one other second node Kn, Ki of the result of a local state estimation on a first node Ki, Kn. In the present case, state estimator KF on this second node Kn, Ki uses the state estimation from first node Ki, Kn as an input value for its own state estimation. This cooperative process is preferably carried out between all nodes Ki, Kn in a mutual manner.

This principle entails that in the suggested arrangement there is no master node, but the state estimators on the individual nodes are connected with each other in such a way that they converge to a consistent common time, or to a common fictitious global time. As seen from the outside, the global clocks of the different nodes in an ideal case provide identical or near-identical global times.

In the described methods and arrangements, the general principle of a novel cooperative state estimator emerges. A particular advantage with respect to the usual prior-art distributed Kalman filters with embedded consensus filters is the fact that the novel cooperative state estimator converges even at slow clocks. In the prior-art distributed Kalman filter this would not work, since changes would occur to quickly to be detected and corrected with a slow clock. This convergence is made possible by the following process which takes the delay caused by the state estimation into account.

The particularly preferred process is as follows:

First, node Kn plans a transmitting time, or the transmitting time point ts (lcn*) at which it sends a state estimation. It then estimates its state, i.e., its global time gcn, for exactly this future transmitting time. When the transmitting time point ts (lcn*) is reached, first node Kn sends this state estimation which can then be received by a second node Ki, which determines the arrival time of the receiving signal and/or with the aid of a propagation time estimation, the transmitting time point of the received signal, and determines from its old existing estimation and the received estimation in combination with the arrival time or the transmitting time its own new improved estimation of the global time gci of second node Ki. This estimation is preferably then provided to other nodes, as is illustrated in FIG. 1 or 4.

Preferably, the cooperative Kalman filters are used as state estimators KF for synchronization, by configuring them in such a way that they estimate the state of a global clock GCi, GCn. If individual stations or nodes Ki, Kn have a reference time source XC, in particular external, with a signal according to DCF, GPS, . . . , for example, they will be treated as sensors giving information on the state of global clock GCi, GCn. Since the usual time sources XC do not provide a confidence value, a suitable, properly dimensioned confidence value di* is to be determined and allocated to their values. This can be done by estimation, physical considerations, measurements or in a heuristic manner.

The cooperative Kalman filters in state estimators KF of the various nodes Kn, Ki converge to a maximally consistent state estimation for each global clock GCn and thus provide a fictitious common time scale.

Herein it is advantageous that the cooperative Kalman filters converge to a consistent state estimation even if no external reference time sources XC according to the GPS or DCF standards, for example, are present.

If no sensor inputs are present in the form of real time sources, in particular, an additional mechanism according to the present invention is necessary to hold the global clocks in their speed close to real time. Otherwise it can happen that the cooperating Kalman filters may converge to a consistent time which is considerably too fast or too slow. In order to prevent this, preferably all the stations concerned carry out a comparison between their real local clocks LCn, LCi and their global clocks GCn, GCi. A consensus mechanism or a voting carried out by a plurality, preferably all nodes Kn, Ki is used to decide on the one hand, whether a regulating intervention should be carried out on global time gcn, gci, and on the other hand it is decided whether global time gcn, gci should be delayed or accelerated. In this manner it is achieved that the global time gcn, gci can usually run freely and therefore paces time very regularly, but so that its running speed cannot break out of a certain quantile of the running speeds of real clocks of the nodes Kn, Ki concerned.

Depending on the application and the consensus mechanism used, this quantile is to be chosen in a suitable manner. A suitable choice would be, for example, that the global time gcn, gci cannot break out of the 33%-66% quantile of the nodes Kn, Ki concerned. In other words, a regulating intervention is carried out which increases the clock rate of the global clock if it falls within the quantile below 33% as a low-speed threshold, and which decreases clock rate if it reaches the quantile above 66% as a high-speed threshold. The magnitude of the regulating intervention is to be dimensioned such that it is not too great on the one hand, since this may lead to instability, on the other hand it must be of sufficient magnitude that the global clock does not further progress into the lower or upper quantile, i.e., does not further migrate in the wrong direction.

Figure 5:
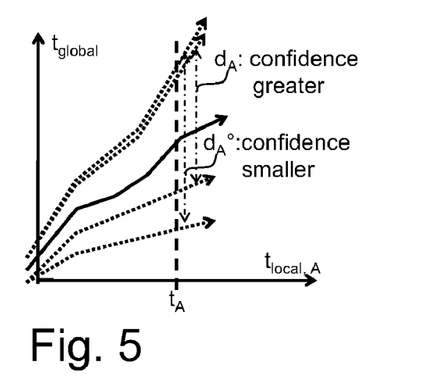
FIG. 5 is a timing graph of a state estimator in a first node.
Figure 6:
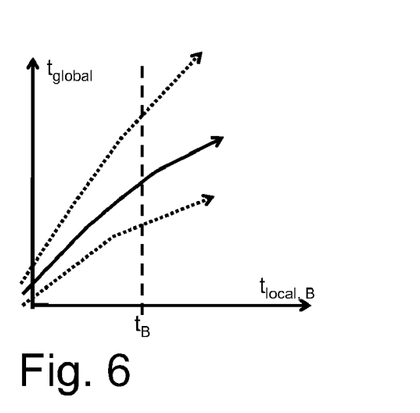
FIG. 6 is a timing graph showing corresponding time diagrams of a state estimator in a second node.

The overall process is then as follows:

The clocks in a communication network are synchronized by implementing local state estimators KF on a plurality of nodes for estimating the global time gcn, gci with the aid of a local time lcn, lci, and this estimated global time gcn, gci is provided to other nodes Ki, Kn within the network with the aid of communication, which in turn can improve a local estimation of their global times gcn, gci. This is explained in FIGS. 5 to 8 in an exemplary manner. FIGS. 5 and 6 show graphs of the global and local time scales $t_{local,A}$ and $t_{local,B}$ of two nodes A and B against the relevant global times $t_{global,A}$ and $t_{global,B}$ for corresponding state estimators. The deviation of the characteristic from a straight line halving the quadrant is based on the various changes in the local and global times. The broken lines indicate possible further graphs of the local and global times in an exemplary manner.

Figure 7:
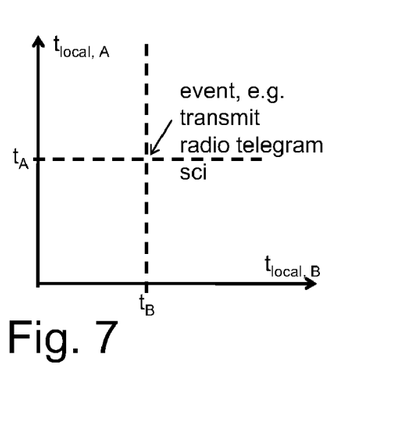
FIG. 7 is a timing graph showing a common event of the two nodes from the point of view of the state estimator in the first node.

FIG. 7 shows the time point of an event, for example sending a radio telegram including transmitting signal sci of another node Ki, according to the state estimator of node A. This event has the corresponding local or global time points or the local receiving time lc1 (FIG. 1, 2) allocated to it. Since events are only known with a certain accuracy, a probability distribution results for the physical global time of the event, while the local receiving time lc1 can be determined by the receiver.

Figure 8:
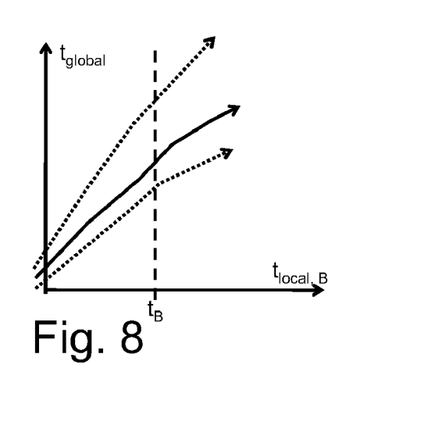
FIG. 8 is a timing graph showing corresponding time diagrams of a more precise estimation in the second node after taking the data of the first node into account.

FIG. 8 shows the graph of global time against local time resulting from the corrections made by the preferred algorithm compared to FIG. 6. The precise estimation in node B after taking the data of node A into account is shown. The slight deviations of the times with respect to each other are clearly to be seen.

One possibility to implement these basic aspects is the utilization of local Kalman filters in state estimators KF.

Kalman filters operate on a state space model of the system to be observed. The model applied in the present case is that of a local clock LCn which deviates from its own global clock GCn by an offset $\delta$ and a differing running speed $\phi_{n,k}$ of local clock LCn with respect to global clock GCn.

$$x_{n,k} = \begin{pmatrix} \delta_{n,k} \\ \varphi_{n,k} \end{pmatrix}$$

as a system state $x_{n,k}$ in the nth node Kn at discrete time point k includes these parameters and maps an estimated transformation $$t_{n,global} = t_{n,lokal} + \delta_{n,k} + \phi_{n,k} \cdot (t_{lokal} - lastupdate_n)$$

between the local and global clock LCn, GCn or between their times lcn, gcn of node n at discrete time point k.

Further it is noted at which time point of a local time $lastupdate_{n,k}$ this state of local clock LCn is present and $lastupdate_{n,k}$ is established as the local time of the most current system state $x_{n,k}$ in node Kn.

Therefore, the current estimated global time point $t_{n,global}$ of the transformation of system state $x_{n,k}$ of node Kn is the following:

$$t_{n,global} = t_{n,local} + \delta_{n,k} + \phi_{n,k} \cdot (t_{local} - lastupdate_n).$$

I.e., if an event of node Kn has local time value $t_{n,local}$ allocated to it, the event occurs at global time point $t_{n,global}$ according to the estimation by node Kn.

Such an event is the future transmitting time point ts (lcn*), in particular, at which node Kn sends its own global time gcn calculated by it to the other nodes. The offset do predicted for this future transmitting time point ts (lcn*) results as follows:

$$do = \delta_{n,k} + \phi_{n,k}(t_{local} - lastupdate_n).$$

In addition to the system state $x_{n,k}$ able to be mapped as a state vector, which represents the estimated system state, an error covariance matrix $$P_{n,k} = \begin{pmatrix} \sigma^2_{\delta_{n,k}} & \sigma_{\delta_{n,k}, \varphi_{n,k}} \\ \sigma_{\delta_{n,k}, \varphi_{n,k}} & \sigma^2_{\varphi_{n,k}} \end{pmatrix}$$

is formulated with $\sigma$ as a statistical symbol for the covariance, which represents the accuracy $P_{n,k}$ of the system estimation.

The accuracy $P_{n,k}$ or a quantity derived therefrom, is provided as a confidence value dn or di of node Kn or the other nodes Ki, i≠n. Preferably confidence value dn is used as a quantity associated with global time gcn in this node Kn for determining its global time gcn. Transmitting together with global time gcn enables further nodes Ki to take the expected accuracy or confidence of the received global time gcn into account. The confidence value dn or di can comprise, in particular, this error covariance matrix or a covariance matrix taking further interfering quantities into account, or can be determined while taking them into account.

If no measuring results, in particular received global times gci and/or GPS time signals etc. are available, the behavior of the system can be estimated with the system equations resulting from the system, with a system matrix:

$$A_{n,k} = \begin{pmatrix} 1 & (now_n - lastupdate_n) \\ 0 & 1 \end{pmatrix}.$$

With $now_n$ as the future value of $lastupdate_n$, the new system state in node Kn is $$\hat{x}_{n,k+1} = A_{n,k} \cdot x_{n,k}$$

the new error covariance matrix is the following:

$$\hat{P}_{n,k+1} = A_{n,k+1} P_{n,k} A_{n,k+1}^T + Q_{n,k+1}.$$

To take modeling errors into account, the error covariance matrix is extended by a model error matrix $Q_{n,k}$. Herein, influences are taken into account, which occur in reality, but which are not represented by the system matrix.

Such influences are, in particular, offset changes of the global and local clocks GCn, LCn by phase noise of the local clock LCn due to errors of the oscillator, frequency changes by voltage oscillations of the oscillator voltage, frequency changes due to temperature changes of the oscillator and frequency changes due to undesirable parasitic capacitances of the oscillator and, as the case may be, of the circuit arrangements forming and surrounding the clock.

Furthermore, care is preferably taken that the usual roundings are carried out in the numerical calculations of the system equation. These can also be seen as modeling errors.

If phase noise does not reach a relevant magnitude in the application, the model error matrix can be formulated as follows $$Q_{k+1} = \begin{pmatrix} 0 & 0 \\ 0 & dDrift \cdot \Delta t \end{pmatrix}.$$

Herein, dDrift is a constant for estimating a drift of the oscillator and therefore of the local clock with respect to a physical time. A practical value in the use of unheated quartz oscillators as a local clock source was 0.0125 ppm$^2$/s in the context of first tests.

If measurements are made, i.e., in particular the reception of GPS time etc. or global times gci of other nodes Ki, in addition to the individual measuring values M, the accuracy of the measurements should suitably be known. This is indicated by means of a covariance matrix R. The current offset $y_{k+1}$ is measured between the node's own estimation of the global time point $t_{n,global}$ of a node Kn for an event E taking place or received in node Kn on the one hand, and on the other hand a global time point $t_{i,global}$ of this event informed by another transmitting node Ki i≠n. At time point k+1, the following therefore applies for the current offset:

$$y_{k+1} = \text{measured current offset}.$$

The drift cannot usually be measured, but must be estimated by the Kalman filter. Since the measured offset $y_{k+1}$ is a one-dimensional vector as a processable quantity, the covariance matrix R has the magnitude 1×1 and includes only the scattering $R_{k+1}$ of the measuring value M. Therefore:

$$R_{k+1}=(\sigma_{y_{k+1}}^2).$$

Scattering $R_{k+1}$ of measuring value M of this offset measurement is constituted by one portion determined by the confidence of the transmitting station, the lack of precision in determining the delay of the radio telegram and the lack of precision in determining the receiving time point.

To improve the state description of the system with the aid of the measuring values, a weighting is carried out between the a-priori estimation from the expansion of the state vector $x_{n,k}$ and the measuring results of the various received measuring values etc. Preferably, each measuring value is directly individually processed. Herein, the weighting is chosen in such a way that the resulting variance matrix of the system has a minimal matrix norm.

$$K=P_{k+1}C^T(CPC^T+R)^{-1}$$

is the Kalman gain, and $$x_{n,k+1}=\hat{x}_{n,k+1}+K_{n,k+1}y_{n,k+1}$$

is the vector representing the improved transformation.

The local Kalman filter in state estimator KF therefore estimates a transformation between the local time lcn of node Kn and the global time gcn of this node Kn. This estimation is provided to the time slot management, which can use it for triggering actions at certain global times gcn, for example, transmitting processes, determining switching edges or operating an RF receiving device.

Local regulating interventions are preferably also used to have the local clock source or oscillator OS track global clock GCn and therefore to avoid an excessive increase of the floating point variable in corresponding software programs to be executed, which otherwise would result in a loss of the accuracy.

The voting is carried out, for example, by adding or weighted adding the votes or deviation amounts vi received from other stations for accelerating or delaying the many global times gci, gcn and, in the case of intervention, causes the intervention in each of the global clocks of the various nodes Ki, Kn.

Transmitting and/or receiving means IO, or a corresponding routine, is responsible to transmit and to receive data in the form of radio telegrams, in particular on the present hardware, and to achieve the best possible accuracy in determining transmitting and receiving time points.

A process for receiving a package consists, in particular, of the subsequent steps, which are illustrated in FIG. 2, in particular.

The transmitter and/or receiver IO handles reception of the package or the received transmitting signal sci from other nodes Ki in a first step and determines the receiving time point lc1 as a time stamp according to the momentary local receiving time (lcn) of local clock LCn of node Kn.

The package or the received transmitting signal sci and the associated time stamp with the local receiving time lc1 are passed to state estimator KF with the Kalman filter in a second step.

The Kalman filter, in a third step, makes a predicting step as to the local receiving time lcn, wherein the variable lastupdate is set in the above formula in such a way that the newly set variable lastupdate corresponds to the new local receiving time lc1.

In a fourth step, the Kalman filter carries out a correction step with the aid of the received global time gci indicated in the package or in the received transmitting signal sci. A difference to the second step consists in that, in the third and fourth steps, a process is described in the Kalman filter.

In a fifth step, which can be carried out prior to or parallel to steps two to four, transmitting/receiving module IO passes the package or the received transmitting signal sci to voting module VM. Herein, transmitting/receiving module IO is preferably configured in such a way that the lowest possible jitter results when passing on events to the remaining hardware.

Finally, in a sixth step, voting module VM counts the individual received votes applied to it in the form of deviation amounts vi, vn. Moreover, a global intervention is carried out at regular intervals, to adapt each global time gcn of node Kn to the received times.

For this purpose, the voting module passes on the result of the voting via the applied deviation amounts vn, vi. Thereafter, an intervention in global clock GCn, or global time gcn is decided, wherein the threshold values sh, st are preferably taken into account. Eventually, a state estimator KF, or its Kalman filter, adapts its transformation estimation to the new global time gcn.

Moreover, preferably, a local intervention is carried out at regular intervals to adapt each local time lcn of node Kn to the global time gcn.

For this purpose, the transformation between local clock LCn and estimated global clock GCn is considered, and, if necessary, a manipulation of local clock LCn or local time lcn, is planned to tune it to global time gcn. Control C then carries out a suitable intervention, if needed, to delay or to accelerate the local clock, for example, or oscillator OS, by means of a suitable parasitic capacitance.

State estimator KF also adapts the estimation of the transformation within the Kalman filter in such a way that the estimated global time gcn continues running in a regular manner independently of the adaptation of the local time lcn.

In order to enable the adaptation of global times gci in other nodes Ki, additionally, a transmitting process is preferably carried out at regular intervals.

In a first step, transmission is planned by way, for example, of a time slot management, for a particular future time point ts (lcn*) of local time lcn. In a second step, state estimator KF and/or control C estimates for this future time point ts (lcn*) global time gcn valid for this node Kn. In a third step, all relevant information and useful data, as the case may be, for time synchronization of other nodes Ki are inserted in the package or transmitting signal to be sent and coded, as the case may be. Finally, the transmitting signal scn is subsequently sent in a fourth step at the planned local time point ts (lcn*) physically at a future time, or at a corresponding global time point gcn of node Kn by its transmitting/receiving module IO.

A special feature herein is that no real sensors, i.e., no exact external clock or time services exist. The Kalman filters of state estimators KF of the various nodes Kn arrive at a common time scale, or at mutually approaching time values of global clocks GCn, GCi by exchanging state estimations of each of their own global clocks GCn, GCi.

A side effect of the complete omission of real sensors in the form of a superordinated master clock or external reference time source XC, is that the overall system is prone to so-called self-fulfilling prophecies. This can be in the form of, for example, a fictitious global clock running substantially faster than real clocks. To prevent this, either individual nodes Kn (FIG. 2), K2, K4 (FIG. 1) are provided with the possibility to measure external time sources, or the network carries out monitoring of the global clocks via deviation amounts vn, vi and ensures regular running at an acceptable running speed via adjusted regulating intervention in the global clocks.

Preferably, this monitoring of the fictitious global clock can be carried out as follows: As soon as more than two thirds of the stations or nodes Kn or Ki detect a uniform deviation in the running speed, a regulating intervention is carried out in the global clock to counteract this deviation. The uniform deviation in the running speed is detectable through deviation amounts vn, vi received together with the global times. In this manner it is achieved that the global clocks can usually run freely and therefore pace time very regularly. However, in this way they cannot break out from the 33% to 66% quantile, for example, of the nodes Kn, Ki concerned. Dimensioning of the quantile can also be different, for example with higher or lower thresholds.

A further embodiment according to the present invention comprises nodes with higher absolute timing accuracy corresponding, for example, to the GPS standard. Packages or data of these nodes are then taken into account in the voting process with higher weighting corresponding to the accuracy gain with respect to the other nodes.

The method or such circuit arrangements can be advantageously used in real time networks, in networks based on TDMA and in particular also in locating systems.

A particularly advantageous embodiment results if such a method is combined with the method shown in International Patent Publication No. WO 2003/047137 ("the '137 Pub."). The method shown therein enables extremely precise comparison of two clocks by exchanging frequency modulated signals.

The method is therefore exceedingly suitable to determine the arrival time of the receiving signal preferably configured according to the '137 Pub., which second node Ki receives. First node Kn would therefore have to generate a transmitting signal/telegram including both the data of its state estimation and a signal for precise time measurement according to the '137 Pub. This combination makes it possible to synchronize radio nodes to an accuracy of less than 1 ns and the clock rates with high precision in the ppb area. With such precisely synchronized nodes Ki, Kn, it is very easy to build up so-called TOA (time of arrival) or TDOA (time difference of arrival) locating systems.

LIST OF REFERENCE NUMERALS/CHARACTERS da, da° confidence value, confidence inversely proportional to the magnitude of da, da°
dcf external time signal, in particular DCF signal
dn, di confidence value for gcn and gci, respectively
di * confidence value for gci*
do predicted offset $\delta_{n,k}+\phi_{n,k}(t_{local}-lastupdate_n)$ with respect to ts(lcn*)
dr time drift between LCn and GCn
gci global time of node Ki
gci* external global time from XC
gcn global time in node Kn
gps external time, in particular GPS signal
gst
i running node index, i=1, 2, 3, ..., n, ..., 1
lc1 local receiving time in node Kn
lcn local time in node Kn
l2 local correction signal for LC1
l3 local correction signal for TM
lcn* future local time
lastupdate$_{n,k}$ local time of the state of local clock LCn
n running index of current node of interest
pcs local computer time
rst reset signal
sci, scn transmitting signal from Ki and Kn, respectively, as a result (gci, di, vi; gcn, dn, vn) of state estimation
sh high-speed threshold
st low-speed threshold
$t_{n,local}$ current estimated local time point in Kn
$t_{n,global}$ current estimated global time point in Kn
to trim signal for LCn or OS
tr trim signal for VS
ts(lcn*) transmitting time point at future local time point lcn*
vi, vn deviation amount for gci, gcn
$\delta_{n,k}$ offset in node Kn at time k
$\phi_{n,k}$ delay difference between lcn and gcn $$\begin{pmatrix} \delta_{n,k} \\ \varphi_{n,k} \end{pmatrix}$$

transformation of characteristics from those of LCn to those of GCn
σ statistical covariance symbol
1 virtual master
2 feedback-control for gci
C control means
CH channel/channels
EM receiving module
GCn global clock in node Kn
GM global intervention module
IO transmitting/receiving module
KF state estimator, in particular Kalman filter
Ki, Kn node i, current node n in question
LCn local clock in node Kn
LM local intervention module
M memory
OS oscillator
PC local computer
S transmitting module
SM transmitting parameter module, determines (scn, gcn, dn, vn) for lcn*
TM trim module
TS time stamp
VM voting module for erg from vi, vn
VS trustworthiness estimator for vn
XC external reference time source
XCV trustworthiness allocating module

The invention claimed is:

1. A method for synchronizing clocks in a network comprising a plurality of nodes that includes at least one receiving node and at least one transmitting node, wherein at least two of said plurality of nodes can communicate with each other and each have a local clock, the method comprising:
   receiving, in the receiving node, from the transmitting node, a global time of said transmitting node transmitted by said transmitting node;
   determining or estimating a global time of said receiving node as a function of both the received global time of said transmitting node and of a local time of the receiving node's own local clock;
   determining or estimating, in at least a first and a second of said plurality of nodes, which may, but does not have to include said receiving node and said transmitting node, a transformation of pre-set characteristics of the respective first and second node's own local time to characteristics of a global clock in such a way that at least one such deviation amount is determined in each of said first and second nodes as a behavior of a ratio between each respective first and second node's own local clock and each respective first and second node's own global clock; and utilizing the deviation amount of one of said first or second nodes in at least one other of said plurality of nodes as an input value for a local state estimation in at least this at least one other node of said plurality of nodes.

2. The method according to claim 1, further comprising: sending the determined or estimated global time of said receiving node from said receiving node to any of said plurality of nodes.

3. The method as claimed in claim 2, further comprising: maintaining a plurality of local times and a plurality of global times respectively associated with the local times on the receiving node.

4. The method according to claim 1, further comprising: utilizing, for the determining or estimating of the global time in the receiving node, the receiving node's own previous global time.

5. The method according to claim 1, further comprising: determining or estimating within the receiving node at least one of: a) a first deviation amount between the receiving node's own global time and the receiving node's own local time; and b) a second deviation amount between the receiving node's own global time and a global time received from outside the receiving node.

6. The method according to claim 5, further comprising: utilizing at least one of the first deviation amount and the second deviation amount by said receiving node for determining or estimating the global time.

7. The method according to claim 5, further comprising at least one of:
a) carrying out a correction to a slower setpoint speed of the global time if a predeterminable proportion of the available deviation amounts exceeds a high-speed threshold; and
b) carrying out a correction to a faster setpoint speed of the global time if a predeterminable proportion of the available deviation amounts falls short of a low-speed threshold.

8. The method according to claim 1, further comprising: determining a confidence value, within the receiving node, in association with its momentary global time, for determining or estimating said global time.

9. The method according to claim 8, further comprising: additionally utilizing the confidence value of the previous global time of the receiving node, within the receiving node, for determining or estimating the global time of said node.

10. The method according to claim 8, further comprising: utilizing, by and within said receiving node, after receiving the global time of another node together with such a confidence value associated with said received global time, said received global time and its associated confidence value for determining or estimating the global time of said receiving node.

11. The method according to claim 1, further comprising: adapting, within the receiving node, the local time of said node to the global time of said node via a time difference value; and
adapting quantities or parameters relating to the previous local time for estimating or determining the global time of said node in such a way that a subsequent estimation or determination of the global time of said node is not affected by the adapted local time.

12. The method according to claim 1, further comprising: additionally utilizing, within the receiving node, for determining or estimating the global time of said node, an external time of a reference time source as an additional external global time, wherein the reference time source is associated with a time system independent from the network of said nodes.

13. The method according to claim 8, further comprising: additionally utilizing, within the receiving node, for determining or estimating the global time of said node, an external time of a reference time source as an additional external global time, wherein the reference time source is associated with a time system independent from the network of said nodes, and a confidence value is associated with the external time depending on from which type of time source the reference time source originates.

14. The method according to claim 1, further comprising: sending the determined or estimated global time of said receiving node to other such nodes at a future point in time; and
prior to transmission, determining, for the future point in time, the then valid global time point or the then valid global time point together with at least one of a deviation amount and a confidence value.

15. The method as claimed in claim 1, further comprising: storing the determined or estimated global time while maintaining the local time by the receiving node.

16. A circuit arrangement for synchronizing clocks in a network comprising a plurality of nodes that includes at least one receiving node and one transmitting node, wherein at least two of said plurality of nodes can communicate with each other and each have a local clock and a local oscillator for clocking said local clock, the arrangement comprising:
a receiving module of at least one receiving node receiving a transmitted global time of the transmitting node;
a controller for determining or estimating a global time of said receiving node as a function of both the received global time of said transmitting node and of a local time of the receiving node's own local clock; and
a local state estimator for determining a confidence value within the receiving node for its momentary global time;
wherein the local state estimator is implemented in a first and second of said plurality of nodes which may, but does not have to include said receiving node and said transmitting node, for determining one deviation amount as a behavior of a ratio between the first node's own local clock and the first node's own global clock, wherein the second node's controller is designed for using the deviation amount of the first node in at least the second node as an input value for the local state estimation in at least this second node.

17. The circuit arrangement according to claim 16, further comprising a transmitting module for transmitting the determined or estimated global time of said receiving node from said receiving node to any of said plurality of nodes.

18. The circuit arrangement according to claim 16, comprising a voting module for determining or estimating a deviation amount between at least one of: a) the receiving node's own global time and the receiving node's own local time; and b) the receiving node's own global time and a global time received from outside the receiving node.

19. The circuit arrangement according to claims 16, wherein said controller assists in implementing a receiving, in the receiving node, from the transmitting node, a global time of said transmitting node transmitted by the transmitting node; and a determining or estimating a global time of the receiving node as a function of both the received global time of the transmitting node and of a local time of the receiving node's own local clock.

20. The circuit arrangement of claim 16, wherein:

the local clock comprises a first physical oscillator and counter; and the global time is determined by a global clock comprising either:

a second physical oscillator and counter; or an element having an input that is the counter value of the local clock and an output that can be used as a clock reading.

\* \* \* \* \*